(12) United States Patent
Kwon et al.

(10) Patent No.: US 8,945,777 B2
(45) Date of Patent: Feb. 3, 2015

(54) ELECTROLYTE FOR ELECTROCHEMICAL DEVICE, METHOD FOR PREPARING THE ELECTROLYTE AND ELECTROCHEMICAL DEVICE INCLUDING THE ELECTROLYTE

(75) Inventors: Yo-Han Kwon, Daejeon (KR); Je-Young Kim, Daejeon (KR); Sang-Young Lee, Gangwon-do (KR); Byung-Hun Oh, Daejeon (KR); Ki-Tae Kim, Daejeon (KR); Hyo-Jeong Ha, Gyeonggi-do (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/315,528

(22) Filed: Dec. 9, 2011

(65) Prior Publication Data

US 2012/0094187 A1 Apr. 19, 2012

Related U.S. Application Data

(63) Continuation of application No. PCT/KR2011/004139, filed on Jun. 7, 2011.

(30) Foreign Application Priority Data

Jun. 14, 2010 (KR) .......................... 10-2010-0056063

(51) Int. Cl.
*H01M 6/18* (2006.01)
*H01M 6/16* (2006.01)
(Continued)

(52) U.S. Cl.
CPC ...... *H01M 10/0525* (2013.01); *H01M 10/0565* (2013.01); *C08J 5/2256* (2013.01); *H01M 8/1048* (2013.01); *H01M 2300/0082* (2013.01); *Y02E 60/122* (2013.01); *C08J 2371/12* (2013.01)
USPC .......................................... 429/309; 429/304

(58) Field of Classification Search
USPC .......................................................... 429/306
See application file for complete search history.

(56) References Cited

U.S. PATENT DOCUMENTS 5,589,295 A * 12/1996 Derzon et al. ................ 429/303
6,284,412 B1 * 9/2001 Minakata et al. ............. 429/303
(Continued)

FOREIGN PATENT DOCUMENTS

EP 0 714 149 A1 5/1996
EP 0 757 397 A1 2/1997
(Continued)

OTHER PUBLICATIONS

Abouimrane, A. et al, "Plastic Crystal-Lithium Batteries: An Effective Ambient Temperature All-Solid State Power Source," Journal of Electrochemical Society, 2004, vol. 151, No. 7, pp. A1028-A1031.
(Continued)

*Primary Examiner* — Ula C. Ruddock
*Assistant Examiner* — Matthew Van Oudenaren
(74) *Attorney, Agent, or Firm* — Birch, Stewart, Kolasch & Birch, LLP

(57) ABSTRACT

Disclosed is a solid electrolyte for an electrochemical device. The solid electrolyte includes a composite consisting of: a plastic crystal matrix electrolyte doped with an ionic salt; and a network of a non-crosslinked polymer and a crosslinked polymer structure. The electrolyte has high ionic conductivity comparable to that of a liquid electrolyte due to the use of the plastic crystal, and high mechanical strength comparable to that of a solid electrolyte due to the introduction of the non-crosslinked polymer/crosslinked polymer structure network. Particularly, the electrolyte is highly flexible. Further disclosed is a method for preparing the electrolyte. The method does not essentially require the use of a solvent. Therefore, the electrolyte can be prepared in a simple manner. The electrolyte is suitable for use in a cable-type battery whose shape is easy to change due to its high ionic conductivity and high mechanical strength in terms of flexibility.

16 Claims, 3 Drawing Sheets

(51) Int. Cl.
*H01M 10/0565* (2010.01)
*H01M 10/0525* (2010.01)
*C08J 5/22* (2006.01)
*H01M 8/10* (2006.01)

(56) References Cited

U.S. PATENT DOCUMENTS

| | | |
|---|---|---|
| 2002/0132169 A1 | 9/2002 | Yamamoto et al. |
| 2004/0197662 A1 | 10/2004 | Maruyama et al. |
| 2007/0172739 A1 | 7/2007 | Visco et al. |
| 2009/0092902 A1* | 4/2009 | Abouimrane et al. ........ 429/306 |
| 2009/0291353 A1* | 11/2009 | Affinito et al. ................ 429/50 |
| 2010/0148632 A1* | 6/2010 | Boersma ....................... 310/328 |

FOREIGN PATENT DOCUMENTS

| | | |
|---|---|---|
| KR | 10-2008-0033421 A | 4/2008 |
| KR | 10-2008-0034219 A | 4/2008 |

OTHER PUBLICATIONS

Fan, L.Z. et al, "Succinonitrile as a Versatile Additive for Polymer Electrolytes," Adv. Funct. Mater., 2007, vol. 17, pp. 2800-2807.

Fan, L.Z. et al., "Composite effects in poly(ethylene oxide)-succinonitrile based all-solid electrolytes," Electrochemistry Communications, 2006, vol. 8, pp. 1753-1756.

Patel, M. et al, "Plastic-polymer composite electrolytes: Novel soft matter electrolytes for rechargeable lithium batteries," Electrochemistry Communications, 2008, vol. 10, pp. 1912-1915.

\* cited by examiner

ELECTROLYTE FOR ELECTROCHEMICAL DEVICE, METHOD FOR PREPARING THE ELECTROLYTE AND ELECTROCHEMICAL DEVICE INCLUDING THE ELECTROLYTE

CROSS-REFERENCE TO RELATED APPLICATION

This application is a continuation of International Application No. PCT/KR2011/004139 filed on Jun. 7, 2011, which claims priority under 35 USC 119(a) to Korean Patent Application No. 10-2010-0056063 filed in the Republic of Korea on Jun. 14, 2010, the entire contents of which are incorporated herein by reference.

TECHNICAL FIELD

The present disclosure relates to an electrolyte for an electrochemical device, a method for preparing the electrolyte, and an electrochemical device including the electrolyte.

BACKGROUND ART

Secondary batteries, being the most representative of the electrochemical devices, are devices which convert external electrical energy to chemical energy, store the electrical energy and generate electricity from the chemical energy when necessary. Secondary batteries or "rechargeable batteries," are designed to be recharged and used multiple times. Lead-acid batteries, nickel cadmium (NiCd) batteries, nickel hydrogen (NiMH) batteries, lithium ion batteries and lithium ion polymer batteries are frequently used as secondary batteries. Secondary batteries have lower costs of use and environmental impact than disposable primary batteries.

Secondary batteries are currently used in places where low power is needed, for example, devices for assisting the start up of car engines, portable devices, instruments and uninterrupted power supply systems. The recent developments in wireless communication technologies have led to the popularization of portable devices and have brought about a tendency for devices to connect to wireless networks. As a result, the demand for secondary batteries is growing explosively. In addition, hybrid vehicles and electric vehicles have been put into practical use to prevent environmental pollution, and by using secondary batteries in these next-generation vehicles, they reduce the weight and cost and extend battery life for long-term use.

Generally, most secondary batteries are cylindrical, prismatic or pouch type in shape because of their fabrication process. That is, a secondary battery is typically fabricated by inserting an electrode assembly composed of an anode, a cathode and a separator into a cylindrical or prismatic metal can or a pouch type case made of an aluminum laminate sheet, and injecting an electrolyte into the electrode assembly. Accordingly, the cylindrical, prismatic or pouch type secondary battery essentially requires a certain space for assembly, which is an obstacle to the development of various types of portable devices. Thus, there is a need for a novel type of secondary battery whose shape is easy to change, and particularly, an electrolyte that has high ionic conductivity without any risk of leakage.

Ionically conductive organic electrolytes predominantly used for conventional electrochemical devices based on electrochemical reactions are in the form of liquids in which salts are dissolved in non-aqueous organic solvents. However, the use of such electrolytes in the form of liquids causes degradation of electrode materials, increases the possibility of evaporation of organic solvents, and poses safety problems, such as fire and explosion resulting from high surrounding temperatures and increased battery temperatures. A risk of leakage and difficulty in realizing various types of electrochemical devices are additional safety problems. In attempts to overcome the safety problems of such liquid electrolytes, polymer electrolytes, such as gel polymer electrolytes and solid polymer electrolytes have been proposed. It is generally known that the safety of electrochemical devices increases in the order of liquid electrolytes, gel polymer electrolytes and solid polymer electrolytes, but the performance thereof decreases in the same order. It is known that electrochemical devices employing solid polymer electrolytes are not yet commercialized due to these inferior performances. Gel polymer electrolytes have low ionic conductivity, suffer from the risk of leakage and possess poor mechanical properties compared to liquid electrolytes.

Korean Unexamined Patent Publication No. 2008-33421 discloses an electrolyte using a plastic crystal matrix instead of using a liquid organic solvent. The electrolyte exhibits ionic conductivity comparable to that of a liquid electrolyte. However, the electrolyte exhibits very poor mechanical properties due to its flowability similar to that of liquid. In actuality, a separator is required to prevent short circuits in a battery using the electrolyte. In some cases, the introduction of linear polymer matrices, such as polyethylene oxide, is considered to improve the mechanical strength of plastic crystal matrix electrolytes. However, even in these cases, the electrolytes do not possess mechanical properties sufficient enough to replace the use of separators and because solvents are used, there exists a problem of having to add an additional drying process.

Thus, there is an urgent need to develop a solid electrolyte using a plastic crystal matrix electrolyte that has improved mechanical properties while maintaining high ionic conductivity of the plastic crystal matrix electrolyte.

DISCLOSURE

Technical Problem

The present disclosure is designed to solve the problems of the prior art, and therefore it is an object of the present disclosure to provide a plastic crystal matrix electrolyte that has high ionic conductivity and can ensure flexibility and mechanical strength, and a method for preparing the electrolyte.

Technical Solution

According to an aspect of the present disclosure, there is provided a solid electrolyte for an electrochemical device which includes a composite consisting of: a plastic crystal matrix electrolyte doped with an ionic salt; and a network of a non-crosslinked polymer and a crosslinked polymer structure.

The plastic crystal may be, for example, succinonitrile.

The ionic salt is preferably a lithium salt. Examples of such lithium salts include lithium bis-trifluoromethanesulfonylimide, lithium bis-perfluoroethylsulfonylimide and lithium tetrafluoroborate.

The non-crosslinked polymer may be selected from: linear polymers, such as polyethylene oxide, polyvinylidene fluoride-co-hexafluoropropylene and polyacrylonitrile; branched polymers, such as poly(methoxy polyethylene glycol methacrylate) and poly(2-methoxy ethyl glycidyl ether); and mixtures of two or more thereof.

The crosslinked polymer structure may be obtained by polymerization of a monomer having two or more functional groups.

The monomer having two or more functional groups is intended to include not only monomers but also polymers with a low degree of polymerization consisting of 2 to 20 repeating units. The monomer may be selected from trimethylolpropane ethoxylate triacrylate, polyethylene glycol dimethacrylate, trimethylolpropane trimethacrylate and ethoxylated bisphenol A dimethacrylate.

According to another aspect of the present disclosure, there is provided a method for preparing the electrolyte, the method including: mixing a plastic crystal matrix electrolyte doped with an ionic salt, a non-crosslinked polymer and a monomer having two or more functional groups to prepare a solution; and polymerizing the monomer having two or more functional groups in the solution.

Advantageous Effects

The electrolyte of the present disclosure has high ionic conductivity comparable to that of a liquid electrolyte due to the use of a plastic crystal, and high mechanical strength comparable to that of a solid electrolyte due to the introduction of a crosslinked polymer structure. Particularly, the electrolyte of the present disclosure is highly flexible. In addition, the method of the present disclosure does not essentially require the use of a solvent, eliminating the need for drying. Therefore, the electrolyte of the present disclosure can be prepared in a simple manner. The electrolyte of the present disclosure is suitable for use in a cable-type battery whose shape is easy to change due to its high ionic conductivity and high mechanical strength comparable to that of a solid electrolyte.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

MODE FOR DISCLOSURE

Figure 1:
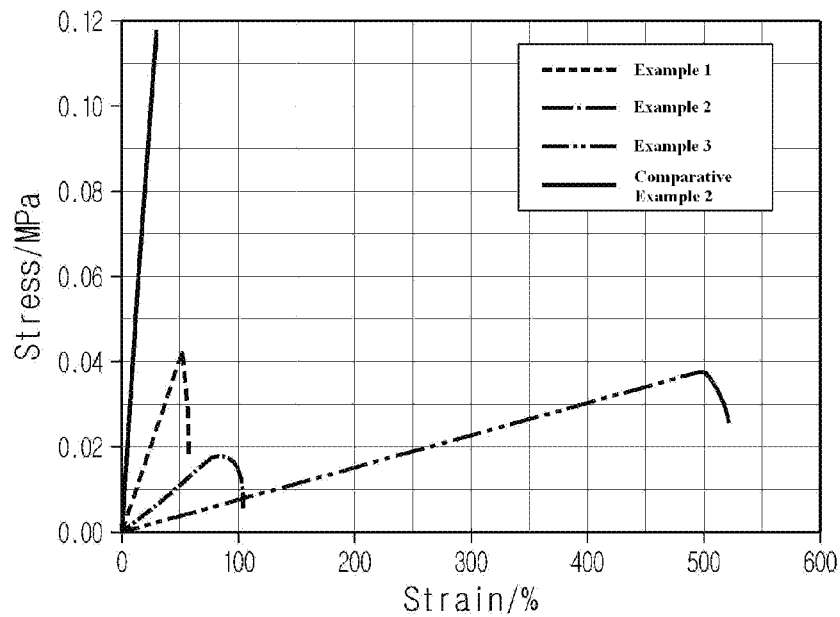
FIG. 1 is a graph showing the tensile strengths of electrolytes prepared in Examples 1-3 and Comparative Example 2.

Hereinafter, preferred embodiments of the present disclosure will be described in detail with reference to the accompanying drawings. It should be understood that the terms used in the specification and the appended claims should not be construed as being limited to general and dictionary meanings, but interpreted based on the meanings and concepts corresponding to technical aspects of the present disclosure on the basis of the principle that the inventor is allowed to define terms appropriately for the best explanation.

The present disclosure provides a solid electrolyte for an electrochemical device which includes a composite consisting of: a plastic crystal matrix electrolyte doped with an ionic salt; and a network of a non-crosslinked polymer and a crosslinked polymer structure.

The weight ratio of the ionic salt-doped plastic crystal matrix electrolyte to the non-crosslinked polymer/crosslinked polymer structure network may be from 30:70 to 90:10. The weight ratio of the non-crosslinked polymer to the crosslinked polymer structure may be from 10:90 to 70:30.

An electrolyte serves as a medium that transports lithium ions between a cathode and an anode and plays an important role in the performance of a secondary battery.

The plastic crystal is a compound whose molecules or ions exhibit rotational disorder but whose center of gravity occupies a position aligned in the crystal lattice structure. The rotational phase of the plastic crystal is generally created by a solid-to-solid transition at a temperature not higher than the melting point. As a result of the solid-to-solid transition, the plastic crystal exhibits high plasticity, mechanical flowability and conductivity. Particularly, the doping with an ionic salt results in high ionic conductivity, making the plastic crystal suitable for use in an electrolyte for a secondary battery. However, flowability of the plastic crystal matrix electrolyte is disadvantageous in terms of mechanical properties. For the purpose of improving this disadvantage, the non-crosslinked polymer/crosslinked polymer structure network is introduced into the plastic crystal matrix electrolyte.

The crosslinked polymer structure has a three-dimensional structure due to the chemical bonding between the molecular chains. In the case where only the crosslinked polymer structure is introduced into the plastic crystal matrix electrolyte, high ionic conductivity and excellent mechanical properties are obtained but insufficient flexibility is exhibited. In the present disclosure, the network in which the crosslinked polymer structure and the non-crosslinked polymer coexist is introduced into the plastic crystal matrix electrolyte to ensure excellent mechanical properties of the electrolyte. The introduction of the network increases the mobility of the non-crosslinked polymer chains to make the electrolyte highly flexible and relatively ionically conductive, compared to the case where only the crosslinked polymer structure is introduced.

The electrolyte of the present disclosure is a composite of the ionic salt-doped plastic crystal matrix electrolyte and the non-crosslinked polymer/crosslinked polymer structure network. The composite can be prepared by homogenizing a monomer having two or more functional groups crosslinkable with the non-crosslinked polymer and the ionic salt-doped plastic crystal matrix electrolyte, and polymerizing the monomer. As a result of the homogenization and polymerization, a semi-interpenetrating network matrix is formed. The semi-interpenetrating network matrix contributes to an improvement in the mechanical properties of the electrolyte to impart the electrolyte with mechanical properties comparable to those of a solid electrolyte and make the electrolyte highly flexible. The uniform distribution of the plastic crystal matrix electrolyte increases the ionic conductivity of the electrolyte.

A single use of a plastic crystal matrix electrolyte using only a linear polymer, such as polyethylene oxide (PEO), cannot provide a film because the plastic crystal matrix electrolyte is in a state similar to a viscous solution or gel. In contrast, the plastic crystal matrix electrolyte, in which the non-crosslinked polymer/crosslinked polymer structure network is formed, exhibits improved mechanical properties, resulting in little danger of short circuits and disconnection even when a force is applied to a battery. In addition, the plastic crystal matrix electrolyte is elastic enough to be suitable for use in a battery system where variability is required, such as a cable-type secondary battery where flexibility is required.

The non-crosslinked polymer may be selected from linear polymers and branched polymers. Examples of suitable linear polymers include polyethylene oxide, polyvinylidene fluoride-co-hexafluoropropylene and polyacrylonitrile. Examples of suitable branched polymers include poly(methoxy polyethylene glycol methacrylate) and poly(2-methoxy ethyl glycidyl ether).

The crosslinked polymer structure is preferably a structure obtained by polymerization of the monomer having two or more functional groups. The monomer having two or more functional groups is intended to include not only monomers but also polymers with a low degree of polymerization consisting of 2 to 20 repeating units. The monomer may be selected from trimethylolpropane ethoxylate triacrylate, polyethylene glycol dimethacrylate, trimethylolpropane trimethacrylate and ethoxylated bisphenol A dimethacrylate.

There is no restriction on the kind of the plastic crystal. Succinonitrile is preferably used as the plastic crystal.

The ionic salt doping the plastic crystal matrix electrolyte is preferably a lithium salt. Examples of such lithium salts include lithium bis-trifluoromethanesulfonylimide, lithium bis-perfluoroethylsulfonylimide and lithium tetrafluoroborate.

The present disclosure also provides a method for preparing the electrolyte. Specifically, the electrolyte is prepared by the following procedure.

First, a plastic crystal matrix electrolyte doped with an ionic salt, a non-crosslinked polymer and a monomer having two or more functional groups are mixed to prepare a solution (S1).

Alternatively, an ionic salt, a plastic crystal matrix, a non-crosslinked polymer and a monomer having two or more functional groups may be mixed to prepare a solution. In this case, there is no need to previously prepare the ionic salt-doped plastic crystal matrix electrolyte.

The weight ratio of the non-crosslinked polymer to the crosslinked polymer structure may be from 10:90 to 70:30.

The non-crosslinked polymer may be any of the above-mentioned polymers. The monomer having two or more crosslinkable functional groups is intended to include not only monomers but also polymers with a low degree of polymerization consisting of 2 to 20 repeating units. The monomer may be any of the above-mentioned monomers. The plastic crystal matrix electrolyte may be any of the above-mentioned plastic crystal matrix electrolytes. The ionic salt may be any of the above-mentioned ionic salts. The ionic salt may be used in an amount of 0.1 to 3 mole % per the plastic crystal matrix.

A solvent may be added during mixing. In this case, drying is additionally needed to remove the solvent. However, the use of the solvent is not necessarily required. A photoinitiator, such as benzoin, may be optionally added to polymerize the monomer.

Subsequently, the monomer having two or more functional group in the solution is polymerized to prepare the solid electrolyte (S2).

There is no particular restriction on the polymerization method. For example, the monomer may be polymerized by UV irradiation. The presence of two or more functional groups in the monomer allows the polymer to have a three-dimensional crosslinked structure.

The present disclosure also provides an electrochemical device including a cathode, an anode and the solid electrolyte. The electrochemical device of the present disclosure includes all devices in which electrochemical reactions occur. Specific examples of such electrochemical devices include all kinds of primary batteries, secondary batteries, fuel cells, solar cells, and capacitors such as supercapacitor devices. Particularly preferred are lithium secondary batteries, including lithium metal secondary batteries, lithium ion secondary batteries, lithium polymer secondary batteries and lithium ion polymer secondary batteries.

Particularly, the solid electrolyte of the present disclosure is injected into an electrode assembly consisting of a cathode, an anode and a separator interposed between the electrodes to fabricate a lithium secondary battery. The cathode, the anode and the separator constituting the electrode assembly may be those that are commonly used in the fabrication of lithium secondary batteries. The electrolyte of the present disclosure may replace the use of the separator because it is in the form of a solid.

Each of the cathode and the anode is composed of an electrode current collector and an electrode active material. A lithium-containing transition metal oxide is preferably used as an active material of the cathode. Specifically, the cathode active material may be selected from the group consisting of $LiCoO_2$, $LiNiO_2$, $LiMnO_2$, $Li_2Mn_2O_4$, $Li(Ni_aCo_bMn_c)O_2$ ($0<a<1, 0<b<1, 0<c<1, a+b+c=1$), $LiNi_{1-y}Co_yO_2$, $LiCo_{1-y}Mn_yO_2$, $LiNi_{1-y}Mn_yO_2$ ($0 \leq y<1$), $Li(Ni_aCo_bMn_c)O_4$ ($0<a<2, 0<b<2, 0<c<2, a+b+c=2$), $LiMn_{2-z}Ni_zO_4$, $LiMn_{2-z}Co_zO_4$ ($0<z<2$), $LiCoPO_4$, $LiFePO_4$, and mixtures of two or more thereof. Other examples include sulfides, selenides and halides. The anode active material may be one capable of intercalating/deintercalating lithium ions. Examples of such anode active materials include carbon materials, lithium-containing titanium composite oxides (LTO); metals (Me), such as Si, Sn, Li, Zn, Mg, Cd, Ce, Ni and Fe; alloys of the metals (Me); oxides of the metals (Me) (MeOx); and composites of the metals (Me) and carbon. Carbon materials are preferred. Low-crystalline carbon materials and high-crystalline carbon materials can be used. Representative examples of low-crystalline carbon materials are soft carbon and hard carbon. Representative examples of high-crystalline carbon materials are natural graphite, Kish graphite, pyrolytic carbon, mesophase pitch based carbon fiber, meso-carbon microbeads, mesophase pitches, and high-temperature sintered carbon materials, such as petroleum or coal tar pitch derived cokes. The anode may include a binding agent. The binding agent may be selected from various kinds of binder polymers, such as vinylidene fluoride-hexafluoropropylene copolymers (PVDF-co-HFP), polyvinylidene fluoride, polyacrylonitrile and polymethylmethacrylate.

The separator may be a porous polymer film that is commonly used in separators for lithium secondary batteries. Examples of materials for the porous polymer film include polyolefin polymers, such as ethylene homopolymers, propylene homopolymers, ethylene/butane copolymers, ethylene/hexane copolymers and ethylene/methacrylate copolymers. The separator may be a laminate of two or more porous polymer films. The separator may be a porous non-woven fabric. Examples of materials for the porous non-woven fabric include, but are not limited to, high melting-point glass fiber and polyethylene terephthalate fiber.

The shape of the lithium secondary battery according to the present disclosure is not particularly limited. The lithium secondary battery of the present disclosure may have a cylindrical or prismatic shape depending on the shape of a can it uses. The lithium secondary battery of the present disclosure may be of pouch or coin type. A cable type having a linear structure, such as a wire, is possible.

Hereinafter, preferred embodiments of the present disclosure will be described in detail. The embodiments of the present disclosure, however, may take several other forms, and the scope of the present disclosure should not be construed as being limited to the following examples. The embodiments of the present disclosure are provided to more fully explain the present disclosure to those having ordinary knowledge in the art to which the present disclosure pertains.

EXAMPLES

Example 1

Preparation of Network of Non-Crosslinked Polymer and Crosslinked Polymer Structure/Plastic Crystal Matrix Electrolyte 50 parts by weight of succinonitrile, 15 parts by weight of polyethylene oxide, and 35 parts by weight of polyethylene glycol dimethacrylate (PEGDMA) having a molecular weight of 400 g/mol were mixed. Lithium bis-trifluoromethanesulfonylimide as a lithium salt was added to the mixture in such an amount that the molar ratio of the lithium salt to the ethylene oxide units of the PEGDMA was 1:8. The resulting mixture was homogenized. Benzoin as a UV initiator was added in an amount of 3 wt %, based on the weight of the PEGDMA.

Thereafter, the mixture was cast on a glass plate and irradiated with UV for 1 min. As a result of the polymerization, an electrolyte was produced in the form of a membrane.

Examples 2-3

Preparation of Networks of Non-Crosslinked Polymer and Crosslinked Polymer Structure/Plastic Crystal Matrix Electrolytes Electrolytes of Examples 2-3 were produced in the form of membranes in the same manner as in Example 1, except that the mixing ratios of succinonitrile, polyethylene oxide and polyethylene glycol dimethacrylate were changed to 50:25:25 and 50:35:15, respectively.

Comparative Example 1

Preparation of Pure Plastic Crystal Matrix Electrolyte 5 mol % of lithium bis-trifluoromethanesulfonylimide was added to 100 parts by weight of succinonitrile and heated to prepare a pure plastic crystal matrix electrolyte.

Comparative Example 2

Preparation of Crosslinked Polymer Structure/Plastic Crystal Matrix Electrolyte 50 parts by weight of succinonitrile and 50 parts by weight of polyethylene glycol dimethacrylate (PEGDMA) having a molecular weight of 400 g/mol were mixed. Lithium bis-trifluoromethanesulfonylimide as a lithium salt was added to the mixture in such an amount that the molar ratio of the lithium salt to the ethylene oxide units of the PEGDMA was 1:8. The resulting mixture was homogenized. Benzoin as a UV initiator was added in an amount of 3 wt %, based on the weight of the PEGDMA.

Thereafter, the mixture was cast on a glass plate and irradiated with UV for 1 min. As a result of the polymerization, an electrolyte was produced in the form of a membrane.

Fabrication Example 1

Fabrication of Half Cell

The electrolyte membrane produced in Example 3 was inserted between tin-plated copper as a working electrode and lithium metal as a counter electrode to fabricate a coin-type half cell.

Comparative Fabrication Example 1

Fabrication of Half Cell

A polyethylene separator was interposed between tin-plated copper as a working electrode and lithium metal as a counter electrode to construct an electrode assembly. Thereafter, an electrolyte solution of 1 M $LiPF_6$ in a mixture of ethylene carbonate and diethyl carbonate (1:2, v/v) as non-aqueous solvents was injected into the electrode assembly to fabricate a coin-type half cell.

Test Example 1

Measurement of Mechanical Properties

Figure 2:
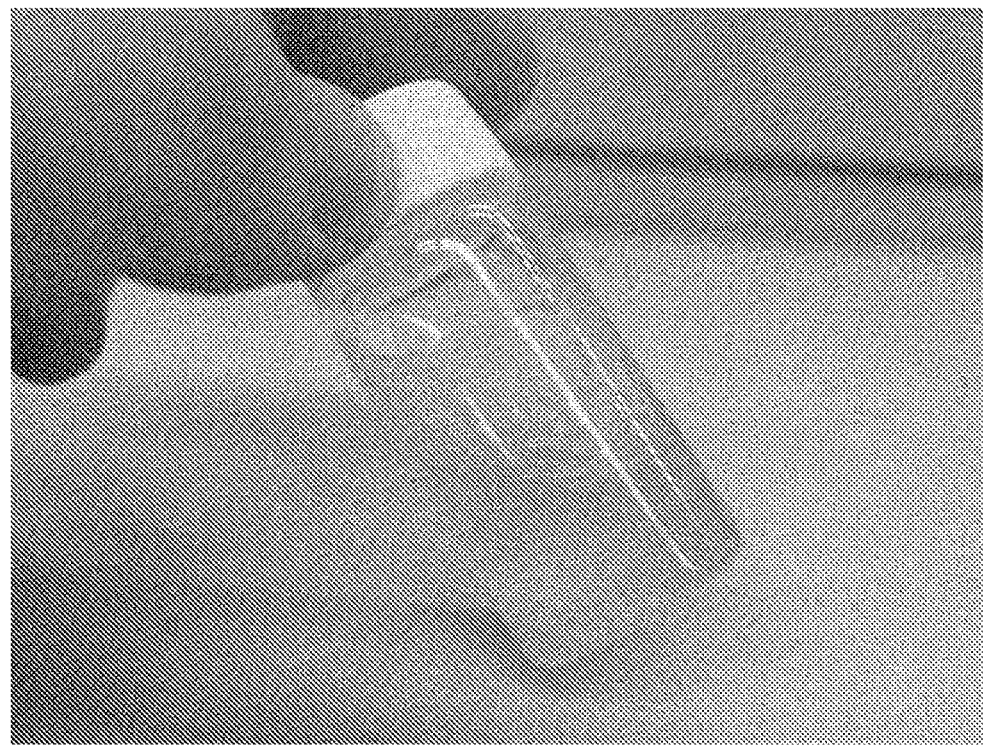
FIG. 2 is a photograph showing the physical properties of an electrolyte prepared in Comparative Example 1.

The tensile strengths of the electrolytes prepared in Examples 1-3 and Comparative Example 2 were measured, and the results are shown in FIG. 1. The electrolyte prepared in Comparative Example 1 could not be formed into a solid film, and a photograph thereof is shown in FIG. 2. From FIG. 2, it can be seen that the electrolyte has very poor mechanical properties.

Referring to FIG. 1, the tensile strength of the electrolyte of Comparative Example 2 was found to be higher than the tensile strengths of the electrolytes of Examples 1-3, but the elongations of the electrolytes of Examples 1-3 were found to be higher than the elongation of the electrolyte of Comparative Example 2. Particularly, the elongation of the electrolyte of Example 3 was highest.

As can be seen from these results, in comparison with the pure crystal electrolyte, each of the plastic crystal matrix electrolytes, in which the non-crosslinked polymer/crosslinked polymer structure network is formed, has improved mechanical properties, resulting in little danger of short circuits and disconnection even when a force is applied to a battery. Particularly, the electrolytes of Examples 1-3 have improved elasticity in terms of elongation, compared to the plastic crystal matrix electrolyte including the crosslinked polymer structure only. Therefore, the electrolytes of Examples 1-3 are suitable for use in battery systems where variability is required, such as cable-type secondary batteries where flexibility is required.

Test Example 2

Measurement of Ionic Conductivities Depending on the PEGDMA Content

Figure 3:
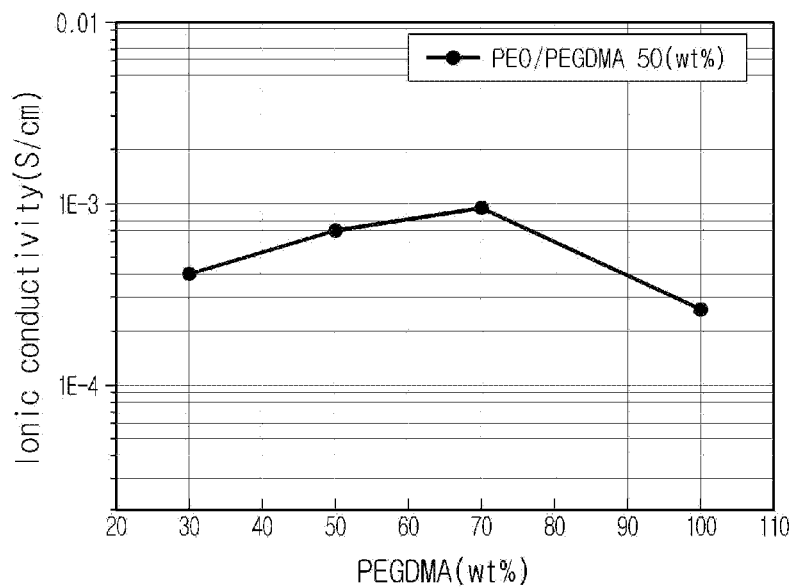
FIG. 3 is a graph showing the ionic conductivities of electrolytes prepared in Examples 1-3 and Comparative Example 2.

The ionic conductivities of the electrolytes of Examples 1-3 and Comparative Example 2 were measured, and the results are shown in FIG. 3.

The similar chemical affinity of PEO and PEGDMA used in Examples 1-3 enables the formation of bulky amorphous structures while preventing phase separation. This is expected to contribute to an improvement in the ionic conductivity of the electrolytes.

Test Example 3

Charge-Discharge Tests on Half Cells

Figure 4:
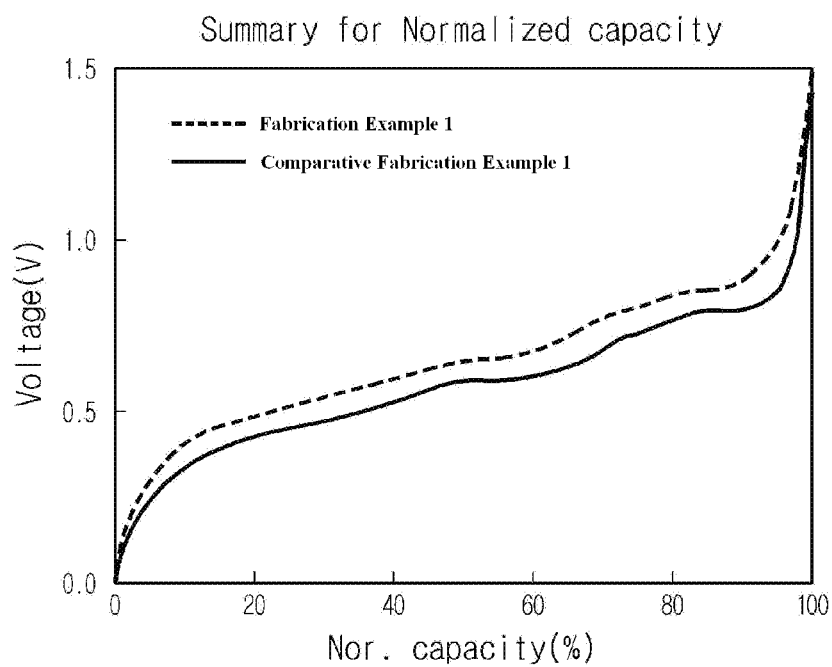
FIG. 4 is a graph showing the performance of half cells fabricated in Fabrication Example 1 and Comparative Fabrication Example 1.
Figure 5:
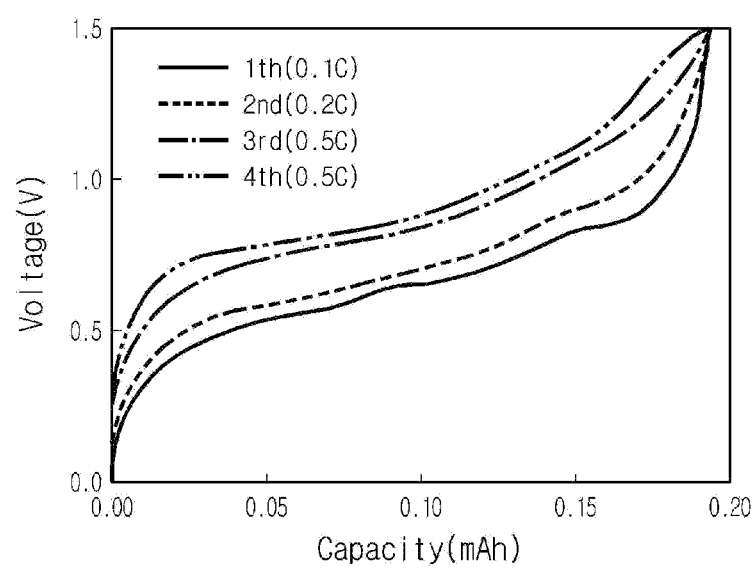
FIG. 5 is a graph showing the performance of a half cell fabricated in Fabrication Example 1.

Each of the half cells fabricated in Fabrication Example 1 and Comparative Fabrication Example 1 was charged to 5 mV with a current density of 0.5 C under constant current conditions and maintained at a constant voltage of 5 mV. The charging was stopped when the current density reached 0.005 C. The half cell was discharged to 1 V with a current density of 0.5 C in a CC mode. Charge and discharge cycles were repeated under the same conditions. The normalized graph is shown in FIG. 4. FIG. 5 is a graph showing discharge curves of the half cell fabricated in Fabrication Example 1.

The half cell fabricated in Fabrication Example 1 has a higher resistance than the half cell fabricated in Comparative Fabrication Example 1 using the liquid electrolyte solution and the separator, but it shows performance comparable to that of general half cells. Particularly, referring to FIG. 5 showing the discharge profile of the half cell of Fabrication Example 1 at a 1.5 V cut, it can be seen that the half cell shows excellent cycle life characteristics.

What is claimed is:

1. A solid electrolyte for a flexible electrochemical device, consisting of a composite consisting of:
   a plastic crystal matrix electrolyte doped with an ionic salt;
   a semi-interpenetrating polymer network comprising a non-crosslinked polymer and a crosslinked polymer;
   optionally residual solvent; and
   optionally a photoinitiator;
   wherein the semi-interpenetrating polymer network is formed in the plastic crystal matrix electrolyte,
   wherein the non-crosslinked polymer is selected from: polyethylene oxide, polyvinylidene fluoride-co-hexafluoropropylene and polyacrylonitrile as linear polymers;
   poly(methoxy polyethylene glycol methacrylate) and poly(2-methoxy ethyl glycidyl ether) as branched polymers; and mixtures thereof,
   wherein the crosslinked polymer structure is obtained by polymerization of a monomer having two or more functional groups selected from trimethylolpropane ethoxylate triacrylate, polyethylene glycol dimethacrylate, trimethylolpropane trimethacrylate, ethoxylated bisphenol A dimethacrylate, and mixtures thereof, and
   wherein said solid electrolyte is suitable for use in a flexible electrochemical device.

2. The solid electrolyte according to claim 1, wherein the ionic salt-doped plastic crystal matrix electrolyte and the non-crosslinked polymer/crosslinked polymer network are present in a weight ratio of 30:70 to 90:10.

3. The solid electrolyte according to claim 1, wherein the non-crosslinked polymer and the crosslinked polymer are present in a weight ratio of 10:90 to 70:30.

4. The solid electrolyte according to claim 1, wherein the plastic crystal matrix electrolyte comprises succinonitrile.

5. The solid electrolyte according to claim 1, wherein the ionic salt is a lithium salt.

6. The solid electrolyte according to claim 5, wherein the lithium salt is selected from lithium bis-trifluoromethanesulfonylimide, lithium bis-perfluoroethylsulfonylimide, lithium tetrafluoroborate, and mixtures thereof.

7. A method for preparing the solid electrolyte according to claim 1, the method comprising:
   preparing a solution consisting of a plastic crystal matrix electrolyte doped with an ionic salt, a non-crosslinked polymer, a monomer having two or more functional groups, optionally solvent and optionally a photoinitiator; and
   polymerizing the monomer having two or more functional groups in the solution;
   wherein the non-crosslinked polymer is selected from: polyethylene oxide, polyvinylidene fluoride-co-hexafluoropropylene and polyacrylonitrile as linear polymers;
   poly(methoxy polyethylene glycol methacrylate) and poly(2-methoxy ethyl glycidyl ether) as branched polymers; and mixtures thereof, and
   wherein the monomer having two or more functional groups is selected from trimethylolpropane ethoxylate triacrylate, polyethylene glycol dimethacrylate, trimethylolpropane trimethacrylate, ethoxylated bisphenol A dimethacrylate, and mixtures thereof.

8. The method according to claim 7, wherein the non-crosslinked polymer and the monomer having two or more functional groups are present in a weight ratio of 10:90 to 70:30.

9. The method according to claim 7, wherein the plastic crystal matrix electrolyte comprises succinonitrile.

10. The method according to claim 7, wherein the ionic salt is used in an amount of 0.1 to 3 moles per mole of the plastic crystal matrix electrolyte.

11. The method according to claim 7, wherein the ionic salt is a lithium salt.

12. The method according to claim 11, wherein the lithium salt is selected from lithium bis-trifluoromethanesulfonylimide, lithium bis-perfluoroethylsulfonylimide, lithium tetrafluoroborate, and mixtures thereof.

13. A flexible electrochemical device comprising a cathode, an anode and the solid electrolyte according to claim 1.

14. The flexible electrochemical device according to claim 13, wherein the electrochemical device is a lithium secondary battery.

15. The solid electrolyte according to claim 1, wherein the composite is prepared by mixing the plastic crystal matrix electrolyte doped with an ionic salt, the non-crosslinked polymer and a monomer having two or more functional groups to prepare a solution; and polymerizing the monomer having two or more functional groups in the solution.

16. The flexible electrochemical device according to claim 14, wherein the battery is a cable-type battery.

* * * * *